United States Patent [19]

Minamida et al.

[11] Patent Number: 4,508,185

[45] Date of Patent: Apr. 2, 1985

[54] COMBINATORIAL WEIGHING METHOD

[75] Inventors: Kazukiyo Minamida, Kouga; Setsuo Haze, Gamou; Seiji Yamada, Kyoto, all of Japan

[73] Assignee: Kabushiki Kaisha Ishida Koki Seisakusuo, Kyoto, Japan

[21] Appl. No.: 414,647

[22] Filed: Sep. 3, 1982

[30] Foreign Application Priority Data

Sep. 4, 1981 [JP] Japan .................. 56-139981

[51] Int. Cl.$^3$ .............. G01G 19/22; G01G 13/02
[52] U.S. Cl. ............................. 177/1; 177/25; 177/70; 177/123
[58] Field of Search ............ 177/1, 25, 70, 123, 177/165

[56] References Cited

U.S. PATENT DOCUMENTS

| | | | |
|---|---|---|---|
| 4,206,822 | 6/1980 | Mazzucchelli | 177/70 X |
| 4,272,824 | 6/1981 | Lewinger et al. | 177/70 X |
| 4,310,060 | 1/1982 | Phillips, Jr. et al. | 177/70 |
| 4,341,274 | 4/1981 | Hirano et al. | 177/123 X |
| 4,366,872 | 1/1983 | Brunnschweiler et al. | 177/165 |
| 4,418,771 | 12/1983 | Henry et al. | 177/1 |
| 4,466,499 | 8/1984 | Minamida et al. | 177/1 |

FOREIGN PATENT DOCUMENTS 2039374 8/1980 United Kingdom .
2067861 7/1981 United Kingdom .

OTHER PUBLICATIONS

Patent Abstracts of Japan, vol. 3, No. 139, pp. 84 E 152.

Primary Examiner—George H. Miller, Jr.
Attorney, Agent, or Firm—Staas & Halsey

[57] ABSTRACT

A combinatorial weighing method which includes steps of dividing a target weight value, set for articles which are to be weighed out, into a plurality of target values, and executing combinatorial computations with respect to each of the target values on the basis of the weight values of the articles fed into a number of weighing machines, so that weighing hoppers selected with respect to each target value do not include weighing machines selected with respect to the other target values. An error between the total weight value of the combination of articles selected as a result of the previous combinatorial computations and the target value for that particular combinatorial computation is formed. The error is added to the target value for the next combinatorial computation and then the next combinatorial computation is executed. After completing the combinatorial computations with respect to all of the target values, the articles are discharged from the selected weighing machines.

6 Claims, 5 Drawing Figures

COMBINATORIAL WEIGHING METHOD

CROSS-REFERENCE TO RELATED APPLICATIONS

This application is related to U.S. application Ser. No. 320,693 filed Nov. 12, 1981, now U.S. Pat. No. 4,396,078, and U.S. application Ser. No. 402,364 filed July 27, 1982.

BACKGROUND OF THE INVENTION

This invention relates to a combinatorial weighing method. More particularly, the invention relates to a combinatorial weighing method for a case where weighing is executed to obtain a target weight value greater than a permissible weight value, the method including steps of dividing the target weight value into a plurality of target values, executing combinatorial weighing for each resulting target value, and discharging the weighed articles on the basis of each of the combinations obtained as a result of the respective combinatorial weighing operations.

A combinatorial weighing method which is known in the art makes use of a plurality of weighing machines each consisting of a weighing hopper and a weight sensor associated with the weighing hopper. According to this known method, combinatorial weighing is carried out by weighing articles which have been introduced into the weighing hoppers of the weighing machines, selecting the combination of weighing machines (referred to as the "best" combination) that gives a total weight value equal to a target weight value or closest to the target weight value within preset allowable limits, discharging only those articles contained by the weighing hoppers of the selected weighing machines, subsequently replenishing the emptied weighing hoppers with new articles, and then finding the best combination again. The foregoing sequence of steps is repeated to carry out a continuous, highly accurate weighing operation in automatic fashion.

FIG. 1 is a schematic diagram of showing the mechanism of a combinatorial weighing apparatus for practicing the weighing method described above. Numeral 11 denotes a main feeder of vibratory conveyance type. Articles to be weighed are introduced into the main feeder 11 and imparted with vibratory motion for a predetermined length of time, so as to be dispersed radially outward from the center of the main feeder. Numerals 12, 12 . . . denote n-number of weighing stations which are arranged around the main feeder 11 along radially extending lines to receive the articles dispersed by the main feeder. Each weighing station 12 includes a dispersing feeder 12a, a pool hopper 12b, a pool hopper gate 12c, a weighing hopper 12d, a weight sensor 12e, and a weighing hopper gate 12f. The dispersing feeder 12a comprises an independently vibratable conveyance device for feeding the articles by means of vibration, or an independently operable shutter. In either case, each dispersing feeder 12a is so arranged that the articles received from the centrally located main feeder 11 can be introduced into the corresponding pool hopper 12b disposed therebelow. The pool hopper gate 12c is provided on each pool hopper 12b in such a manner that the articles received in the pool hopper 12b are released into the weighing hopper 12d when the pool hopper gate 12c is opened. Each weighing machine consists of a weighing hopper 12d and weight sensor 12e of its own, the latter being attached to the hopper 12d. The weight sensor 12e is operable to measure the weight of the articles introduced into the corresponding weighing hopper 12d, and to apply an electrical signal indicative of the measured weight to a combination control unit (not shown). The combination control unit then selects the combination of articles (known as the "best" combination) that gives a total weight equal to a target weight value or closest to the target weight value within preset allowable limits, as will be described below in further detail. Each weighing hopper 12d is provided with its own weighing hopper gate 12f. A drive control unit, not shown, upon receiving the signals from each of the weight sensors, produces a signal to open only the weighing hopper gates 12f of those weighing machines that give the best combination, these gates 12f discharging the articles into a common chute 13 where they are collected together. The collecting chute 13 has the shape of a funnel and is so arranged as to receive the articles from any of the circularly arrayed weighing hoppers 12d via the hopper gates 12f, which are located above the funnel substantially along its outer rim. The articles received by the collecting chute 13 are collected at the centrally located lower end thereof by falling under their own weight or by being forcibly shifted along the inclined wall of the funnel by a mechanical scraper or the like, which is not shown. The collecting chute 13 is provided with a timing hopper 14 at the lower end thereof for temporarily holding the collected articles. The arrival of an externally applied signal from a packaging machine or the like causes the timing hopper 14 to release the retained articles from the system.

In operation, articles are charged into each of the pool hoppers 12b and weighing hoppers 12d. The weight sensors 12e associated with the weighing hoppers 12d measure the weights of the articles and supply the combination control unit (not shown) with signals indicative of the measured weight values, denoted $W_1$ through $W_n$. The combination control unit computes combinations based on the weight values $W_1$ through $W_n$ and selects the best combination of articles that gives a total weight closest to a target weight value. The drive control unit (not shown) responds by opening the prescribed weighing hopper gates 12f based on the best combination, whereby the articles giving said best combination are released into the collecting chute 13 from the corresponding weighing hoppers 12d. This will leave the selected weighing hoppers 12d empty. Subsequently, therefore, the pool hopper gates 12c corresponding to the empty weighing hoppers 12d are opened to introduce a fresh supply of the articles from the respective pool hoppers 12b into said weighing hoppers 12d, leaving these pool hoppers 12b empty. Accordingly, the dispersing feeders 12a which correspond to the empty pool hoppers 12b are vibrated for a predetermined period of time to deliver a fresh supply of the articles to these pool hoppers. This restores the weighing apparatus to the initial state to permit resumption of the control operation for selecting the best weight combinations in the manner described. Thus, weighing by the combinatorial weighing apparatus may proceed in continuous fashion by repeating the foregoing steps.

Let us examine a case where $X_a$ grams are to be weighed out in a combinatorial weighing apparatus having N-number of weighing machines. The target weight value will therefore be $X_a$ grams. To obtain the target weight, the amount of articles fed to each weighing machine should be adjusted to have an average value of $2X_a/N$ grams when N is even, and $2X_a/(N+1)$ grams or $2Xa/(N-1)$ grams when N is odd. The reason is as follows. The number of combinations that can be computed by a combinatorial weighing apparatus composed of N weighing machines, where a combination may be made up of only one weighing machine or up to all N of the weighing machines, is $2^N-1$. When N is even, combinations composed of N/2 weighing machines will be the largest in number among said $2^N-1$ combinations. When N is odd, combinations composed of $(N+1)/2$ or of $(N-1)/2$ weighing machines will be the largest in number among said $2^N-1$ combinations. For example, when N=10, only ten combinations made up of one weighing machine each will exist, whereas the number of combinations composed of five (i.e., N/2) weighing machines will be 252 in number. Accordingly, the weight of the articles fed into each weighing machine of the apparatus should be in the neighborhood of $1/(N/2)$ of the target value $X_a$. In a case where the weight values of the individual article collections are controlled in this manner, there is a very high probability that the sought combination (i.e., the "best" combination) will exist in the combinations composed of N/2 or $(N/2)\pm 0.5$ weighing machines, thereby enabling an extremely accurate weighing operation. In other words, if we assume that the weight of the collection of articles fed into each weighing machine is approximately $2X/N$ grams, then the largest weight value (referred to hereinafter as the permissible weight value) that can be measured with great accuracy by the above-described combinatorial weighing apparatus will be $X+\alpha$ grams $(O<\alpha<X)$. In order to conduct a combinatorial weighing operation to obtain a target weight value $X_a$ greater than the largest permissible weight value, therefore, it is common practice to either (A) divide the target weight value $X_a$ into a number of weight values X1, X2, X3 . . . each of which is less than the largest permissible weight value, and then simply repeat the combinatorial weighing operation a plurality of times, or (B) divide the target weight into a number of weight values each of which is less than the permissible weight value and then, in conducting the weighing operation from the second weighing operation onward, correcting the target weights X2, X3, . . . that will prevail each time by the error resulting from the previous weighing operations.

Weighing method (B) outlined above will now be described in greater detail with reference to the flowchart of FIG. 2. We will assume that the target weight value $X_a$ is 3X grams, and that X1=X, X2=X, X3=X. In order to weigh out 3X grams of the articles, method (B) proceeds in the following fashion:

(1) First, all of the weighing machines are supplied with articles.

(2) The weights of the articles fed into the weighing hoppers of the weighing machines are measured (first weight measurement).

(3) Combinations are computed with X1 (=X) grams serving as the target, and the difference between X and Y1, which is the total weight value of the articles contained by those weighing machines that give the best combination, is stored in memory as an error E1 (=Y1−X).

(4) The articles are discharged from the weighing machines that give the best combination (first discharge operation).

(5) The emptied weighing hoppers of the weighing machines, that is, those that have discharged their articles, are supplied with articles afresh.

(6) The weights of the articles fed into the weighing hoppers of the weighing machines are measured (second weight measurement).

(7) Combinations are computed with X2 −E1 (=X−E1) grams serving as the target, and the difference between the target value (X−E1) and Y2, which is the total weight value of the articles contained by those weighing machines that give the best combination, is stored in memory as an error E2 (=Y1+Y2−2X). It should be noted that:

$$E2 = Y2 - (X - E1)$$
$$= Y1 + Y2 - 2X$$

(8) The articles are discharged from the weighing machines that give the best combination (second discharge operation).

(9) The weighing hoppers of the weighing machines that have discharged their articles are supplied with articles afresh.

(10) The weights of the articles fed into the weighing hoppers of the weighing machines are measured (third weight measurement).

(11) Combinations are computed with X3−E2 (=X−E2) grams serving as the target, and the articles are discharged from the weighing machines that give the best combination (third discharge operation). The end result is 3X grams of the articles.

Both of the methods (A) and (B) described above are attended by disadvantages. With method (A), combinatorial weighing is executed independently for each of the plurality of target values X1, X2, X3, as described. Consequently, since the batch of articles weighed out by each independent weighing operation may include an error, the errors resulting from the weighing operations would be compounded when the three weighed-out batches are combined into the single desired batch. The end result is poor weighing accuracy. For example, if the first combinatorial weighing operation generates an error of −10 grams and the second an error of −8 grams, then 982 grams of the articles would actually be weighed out for a target weight of 1000 grams.

With method (B), on the other hand, the operation of introducing articles into the weighing hoppers, measuring weights and then discharging the selected articles is repeated each time combinatorial weighing is performed for each and every one of the divided target values X1, X2, X3 . . . , making it impossible to carry out weighing at high speed because of the time involved for the weighing step. Since the weighing hoppers tend to oscillate whenever they are supplied with the articles, the length of the time required for repeated weighing operations can be particularly great since weight sensing cannot begin until the weighing hoppers stabilize.

SUMMARY OF THE INVENTION

Accordingly, an object of the present invention is to provide a combinatorial weighing method that enables combinatorial weighing to be performed rapidly and with great accuracy in cases where combinatorial weighing is executed to obtain a target weight value greater than the largest permissible weight value.

Another object of the present invention is to provide a combinatorial weighing method wherein articles need be introduced and discharged only once in cases where combinatorial weighing is executed to obtain a target weight value greater than the largest permissible weight value.

A further object of the present invention is to provide a combinatorial weighing method of the type where combinatorial weighing is executed to obtain a target weight value greater than the largest permissible weight value, particularly of the type where the target weight value is divided into a plurality of target weight values, combinatorial weighing is performed for each of the divided target weight values, and articles are discharged based on each combination obtained by the respective combinatorial weighing operation, in which any errors resulting from the respective combinatorial weighing operations are not compounded.

Other features and advantages of the invention will be apparent from the following desciption taken in conjunction with the accompanying drawings in which like reference characters designate the same or similar parts throughout the figures thereof.

DESCRIPTION OF THE PREFERRED EMBODIMENT

Before beginning a description of a preferred embodiment of the invention, we shall assume that with a target value of X grams and ten weighing machines, articles can be obtained having a total weight within preset allowable limits when 2X/10 grams of the articles are introduced into each weighing machine. In such case there will be a high probability that the collection of articles giving said total weight will be discharged from five of the weighing machines.

For a case where the target weight value $X_a$ is 2X grams, which exceeds the maximum permissible weight value (as defined earlier), it will be possible to execute a highly precise, high-speed combinatorial weighing operation if divided weighing is carried out in accordance with the following steps (a) through (e): (a) provide 15 of the weighing machines, (b) supply each weighing machine with 2X/10 grams of the articles, (c) divide the target weight value $X_a$ (=2X) into X1 (=X) and X2(=X), (d) first execute a first combinatorial weighing operation to obtain the target weight value X1 using ten of the weighing machines and (e) then execute a second combinatorial weighing operation, to obtain a target weight value (X2−E) (=X−E) that takes into account an error E generated by the first combinatorial weighing operation, using those weighing machines not selected by the first combinatorial weighing operation, as well as the remaining five weighing machines (for a total of ten weighing machines).

By virtue of the foregoing method, the weighing machines are supplied with articles only once, the weights are measured only once, and the selected weighing machines discharge their articles only once in order to provide the target weight. Combinatorial weighing therefore takes place rapidly and with great accuracy. According to the above method, $X_a$ grams of the articles are obtained by dividing the target weight value $X_a$ into X1 and X2, first executing processing for the first combinatorial computation using ten of the 15 weighing machines, and then executing processing for the second combinatorial computation using the unselected weighing machines and the remaining five weighing machines, for a total of ten machines. According to this feature of the invention, $2^{10}-1$ combinations are computed in each of the first and second combinatorial computation operations, and a total of $2^{11}-2$ combinatorial computation steps are performed by a combination computing unit. This is a number of computation steps which is much smaller than would be required with the conventional non-divisive weighing method, enabling combinatorial weighing to take place at far higher speed. With the conventional method, $2^{15}-1$ combinations would require to be computed, and the total number of combinatorial computation steps would be $2^{15}-1$.

Figure 3:
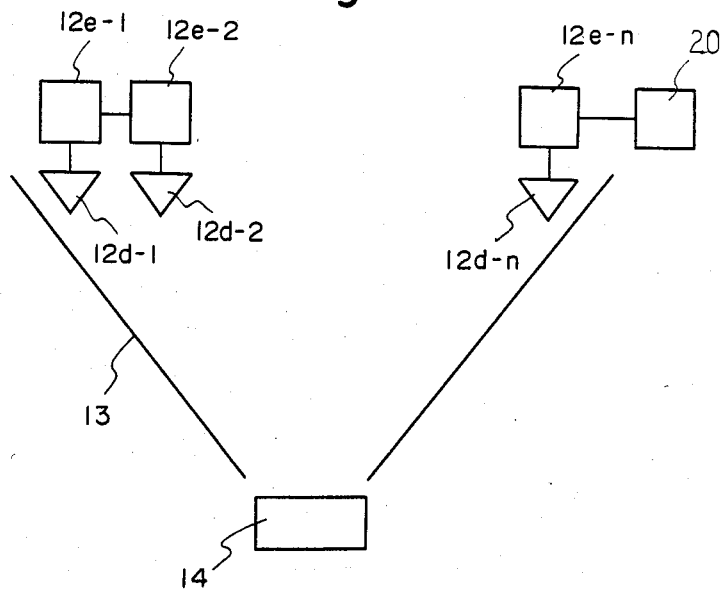
FIG. 3 is a schematic diagram useful in describing the method of the present invention.
Figure 2:
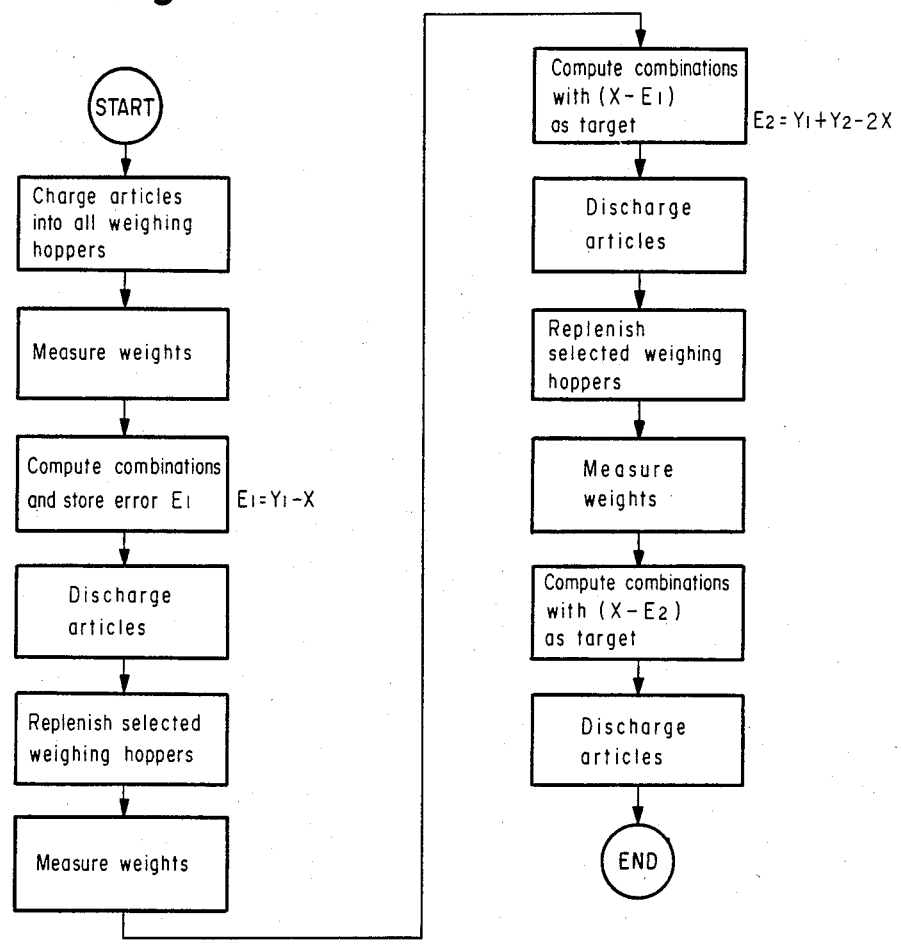
FIG. 2 is a flowchart of a divided combinatorial weighing operation.

Reference will now be had to FIG. 3 to describe the general features of the present invention. Weighing hoppers 12d-1, 12-2, . . . 12d-n are supplied with suitable quantities of articles by respective pool hoppers (not shown). Corresponding weight sensors 12e-1, 12e-2, . . . 12e-n weigh the articles fed into the weighing hoppers and deliver signals, indicative of the measured weight values, to a combination computing unit 20. The latter unit computes combinations based on all of the weight values provided by the weight sensors, and selects the best combination of weighing machines, namely the best combination of articles, that gives a total weight equal or closest to a target value, where the target value is one-half of the target weight value $X_a$ (=2X). The computing unit 20 then computes, as an error, the difference between the total weight value of the selected articles and the target value. When the error has been computed, the computing unit 20 proceeds to combine the error with one-half the target weight value to provide the target value for the second combinatorial weighing operation. Here combinations are computed again based on the remaining weight values unselected by the first combinatorial weighing operation, after which the computing unit selects the best combination of these weight values that gives a total weight value equal or closest to the latter target value. Thenceforth the computing unit causes the weighing hoppers selected as a result of the first and second combinatorial computations to release their articles into the chute 13 for collection in the timing hopper 14.

The end result of the foregoing operations is that the total weight of the selected articles is that equal or closest to the target weight value $X_a$. More specifically, since the error between the first target value and the weight of the articles selected by the first combinatorial computation is added to the target value for the second combinatorial computation when said computation is performed, compensation is effected for the first-mentioned error, so that the only error left is that generated by the second combinatorial computation. Thus, excellent weighing accuracy is achieved because the errors are not compounded. An example will clarify the situation. Assume that the weight of the articles desired to be obtained is one kilogram. In other words, the target weight value (namely $X_a$) shall be one kilogram. The first combinatorial computation operation should therefore select the best combination for a target value of 500 grams. If the weight of the articles actually selected by this first combinatorial computation is only 490 grams, for an error of 10 grams, then the second combinatorial computation operation will select the best combination for a target value of 510 grams, namely a target value to which the error of 10 grams has been added. If the articles selected by this second combinatorial computation have a weight of 505 grams, because of an error, then the total weight of the selected articles will be 995 grams. It will be appreciated, therefore, that the weight of the articles obtained includes a very small error with respect to the target weight value of 1000 grams.

It should be noted that the invention is not limited by the case described above in which articles of the target weight are obtained as the result of performing two combinatorial computation operations. These computations can be performed more than two times with the same actions and effects.

A combination computing unit for practicing the method of the invention will now be described with reference to FIG. 4. It will be assumed that 15 weighing machines are provided.

Figure 4:
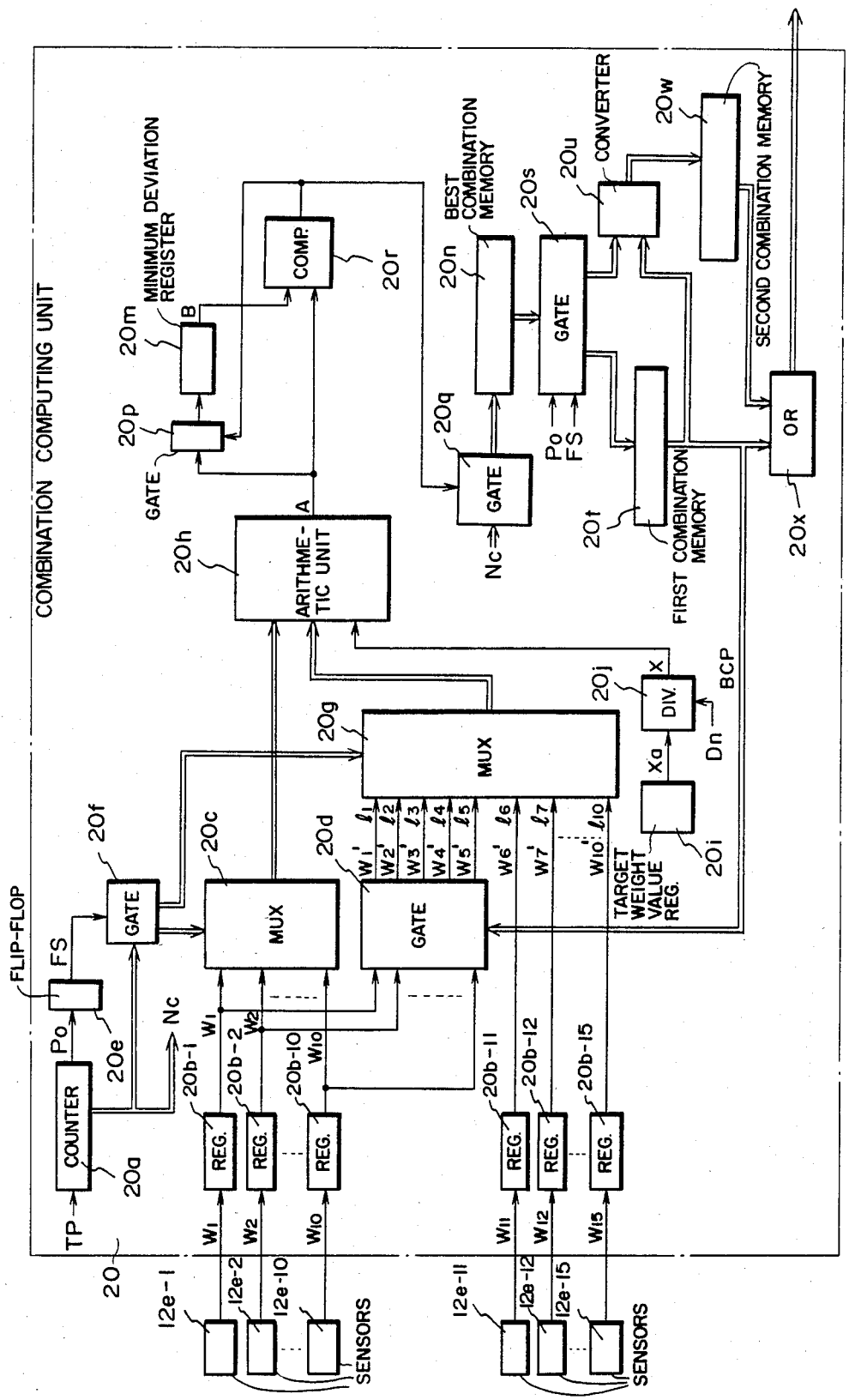
FIG. 4 is a block diagram of a combination control unit for practicing the method of the present invention.

In FIG. 4, numeral 20 denotes a combination computing unit which includes an n-bit (n=10) counter $20a$ for counting timing pulses TP of a predetermined frequency, and for generating all combinations of n-number of the weighing machines. These combinations will also be referred to as "combination patterns" where appropriate. Specifically, for n-number of weighing hoppers, n combinations are possible when each combination is composed of one weighing hopper from the total of n weighing hoppers, $n(n-1)/2!$ combinations are possible when each combination is composed of two weighing hoppers selected from said total, and, in general, $n(n-1)(n-2) \ldots (n-r+1)/r!$ combinations are possible when each combination is composed of r-number of weighing hoppers selected from said total of n weighing hoppers. Accordingly, when the n-bit binary counter $20a$ has counted $2^n - 1$ timing pulses TP, a total of $2^n - 1$ different bit patterns, from 000 . . . 001 to 111 . . . 111, will have been generated. Therefore, if a correlation is established between the first bit and the first weighing hopper, between the second bit and the second weighing hopper, and between third through n-th bits and the third through n-th weighing hoppers, then the generated bit pattern will be an indication of the above mentioned combination pattern. Registers $20b$-1, $20b$-2, . . . $20b$-15 are provided for storing weight values W1, W2, . . . W15 produced by the respective 15 weight sensors $12e$-1, $12e$-2, . . . $12e$-15.

A multiplexer $20c$, in accordance with the output bit pattern of the counter $20a$, provides an arithmetic unit $20h$ with the weight values read out of the registers of the corresponding weight sensors, these belonging to the first ten of the weight sensors $12e$-1 through $12e$-10. For instance, if the value of the count (the bit pattern) in counter $20a$ is 1000101011 when n=10, then the arithmetic unit $20h$ will receive the weight value outputs W1, W2, W4, W6, W10 from the first, second, fourth, sixth and tenth weight sensors $12e$-1, $12e$-2, $12e$-4, $12e$-6, $12e$-10, respectively. A gating circuit $20d$ is adapted to deliver, in the form of electric signals, the weight values sensed by the weight sensors of those weighing hoppers not selected by the first combinatorial computation operation, described above. More specifically, the inputs to the gating circuit $20d$ are a first best combination bit pattern BCP received from a combination memory to be described below, and the weight values W1 through W10 from the respective weight sensors $12e$-1 through $12e$-10. The gating circuit $20d$ responds by producing signals indicative of the weight values from the weight sensors of the weighing hoppers not selected by the first combinatorial computation operation. For example, if the best combination pattern resulting from the first combinatorial computation is 1001011001, then the gating circuit $20d$ will deliver the weight values W2, W3, W6, W8 and W9 from the second, third, sixth, eighth and ninth weight sensors, respectively, the signals indicative of these weight values appearing on the gating circuit output lines $l_1$, $l_2$, $l_3$, $l_4$, $l_5$ and being denoted by W1', W2', W3', W4' and W5', respectively.

A flip-flop $20e$, initially in the reset state, is set (i.e., signal FS goes to logical "1") when the first combinatorial computation operation ends, namely when the counter $20a$ produces a carry pulse Po upon counting $2^n$ of the timing pulses TP, and is reset when the second combinatorial computation operation ends (i.e., signal FS goes to logical "0"). Signal FS from flip-flop $20e$ enters a gating circuit $20f$ which, when flip-flop $20e$ is in the reset state (i.e., during processing for the first combinatorial computation operation ), delivers the status of counter $20a$ to a multiplexer $20g$, and which, when flip-flop $20e$ is in the set state (i.e., during processing for the second combinatorial weighing operation), delivers the status of counter $20a$ to the multiplexer $20c$. The multiplexer $20g$, in accordance with the bit pattern output of counter $20a$, provides the arithmetic unit $20h$ with predetermined ones of the weight values belonging to the weight values W1' through W10' arriving on the lines $l_1$ through $l_{10}$. For example, if the status of counter $20a$ is 1001111000, then the multiplexer $20g$ will provide the arithmetic unit $20h$ with the weight values W4', W5', W6' (=W11), W7' (=W12) and W10' (=W15). A target weight value register $20i$ is provided for storing the target weight value $X_a$ (=2X). The register $20i$ is connected to a divider $20j$ which divides the target weight value $X_a$ by a divisor Dn (=2 in this example), the divider $20j$ providing the arithmetic unit $20h$ with the result of the division, namely $X_a/2$ (=X).

The arithmetic unit $20h$ computes, and delivers the absolute value of, the difference between the gross weight $\Sigma W_i$ delivered by multiplexer $20c$ or $20g$, and the target weight value X. More specifically, the arithmetic unit $20h$ performs the operation:

$$|\Sigma W_i - X| = A \ldots (1)$$

and produces A representing the absolute value (hereafter referred to simply as the "deviation") of the difference between the gross weight $\Sigma W_i$ of the combination and the target weight value X. Numeral $20m$ denotes a minimum deviation register whose initially set value is the target weight value X, but whose content is thenceforth updated in a manner to be described later. A best combination memory for storing the best combination pattern is designated at numeral $20n$. Numerals $20p$, $20q$ denote gates, and $20r$ a comparator which compares the deviation value A, namely the output of the arithmetic unit $20h$, with the minimum deviation value, denoted by B, stored in the minimum deviation register $20m$. When the inequality A<B holds, the output of comparator $20r$ is such that the deviation value A is delivered for storage to the minimum deviation register 20m through the gate 20p, and the content Nc (combination pattern) of counter 20a is delivered for storage to the best combination memory 20n.

Numeral 20s denotes a gating circuit. When the first combinatorial computing operation ends, namely when flip-flop 20e is in the reset state (FS="0") and the carry pulse Po is generated, the gating circuit 20s causes the best combination pattern of ten bits, stored in the best combination memory 20n, to be stored in the first through tenth bits of a 15-bit first combination memory 20t. When the second combinatorial computing operation ends (i.e., FS="1", Po="1"), the gating circuit 20s causes the best combination pattern, stored in the best combination memory 20n, to be delivered to a converter 20u. The latter converts the ten-bit best combination pattern, obtained from the second combinatorial computing operation, into a 15-bit pattern. Assuming that the best combination pattern obtained from the first combinatorial computing operation is 1001011001, in the second combinatorial computing operation the first bit will correspond to the second weight sensor 12e-2, the second bit to the third weight sensor 12e-3, the third bit to the sixth weight sensor 12e-6, the fourth bit to the eighth weight sensor 12e-8, the fifth bit to the ninth weight sensor 12e-9, and the sixth through tenth bits will correspond to the 11th through 15th weight sensors 12e-11 through 12e-15, respectively. When the best combination pattern is provided by the processing for the second combinatorial computation, therefore, the ten-bit best combination pattern must be converted into a 15-bit pattern in such a manner that correspondence is established between each of the weight sensors 12e-i (i=1, 2, ..., 15) and the i-th bit. For example, if the best combination pattern afforded by the second combinatorial computation is 1000001111, the converter 20u converts this pattern into the pattern 1000010100110, because of the aforementioned corresponding relationship between each bit and each weight sensor. The converter 20u then stores this pattern in a second combination memory 20w.

Figure 1:
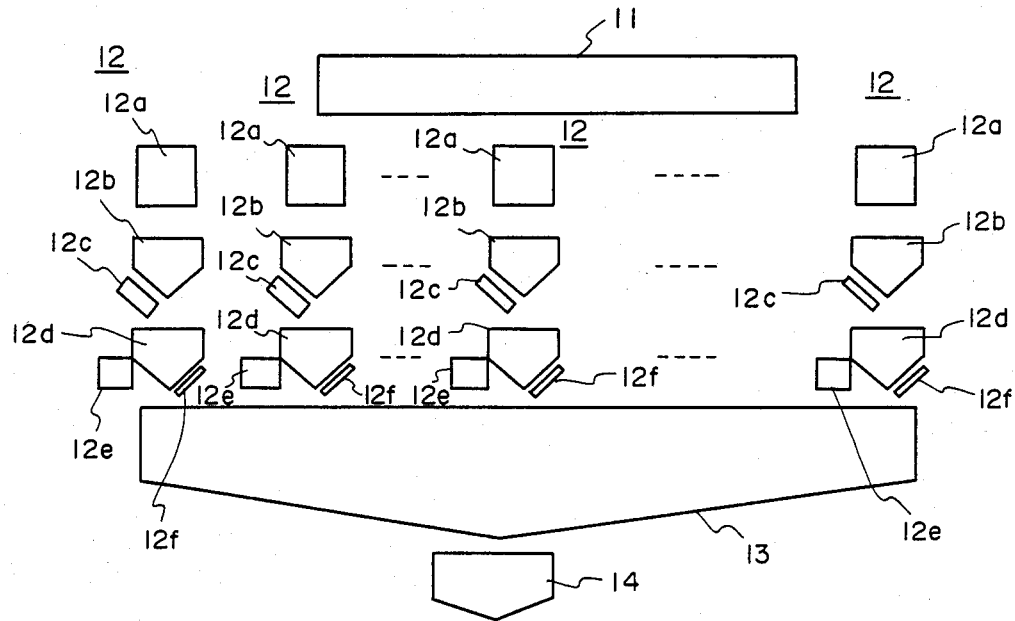
FIG. 1 is a schematic diagram of the mechanism of a combinatorial weighing apparatus for practicing the combinatorial method of the present invention.

An OR gate 20x receives the 15-bit best combination patterns from each of the first and second combination memories 20t, 20w and takes the OR between the corresponding bits, producing an output which is coupled to a drive control unit, not shown. The drive control unit, in accordance with the output of the OR gate 20x, opens the specified weighing hopper gates 12f (FIG. 1), causing the corresponding weighing hoppers 12d to discharge their articles into the chute 13 and, concurrently, causing the corresponding pool hopper gates 12c to open to supply the emptied weighing hoppers 12d with articles afresh.

The operation of the weighing apparatus will now be described in brief. At the beginning, each of the pool hoppers 12b and weighing hoppers 12d contains a supply of the articles. All of the weight sensors 12e provided on the corresponding weighing hoppers 12d measure the weights of the articles and produce the weight values W1 through W15 which are sent to the combination control unit 20 for storage in the registers 20b-1, 20b-2, ..., 20b-15, respectively. The n-bit (n=10) counter 20a counts the timing pulses TP having the predetermined frequency to produce $2^n - 1$ combination patterns. Thus, when the first timing pulse TP arrives and is counted, the content of counter 6b becomes 0000000001. As a result, the multiplexer 20c sends the first weight value signal W1, from the weight sensor 12e-1 provided on the first weighing hopper, to the arithmetic unit 20h, which responds by performing the operation specified by equation (1) above, thereby producing the signal indicative of the deviation A (=|W1−X|) between the gross weight of the combination and X, which is one-half of the target weight value $X_a$. Next, the comparator 20r compares A with the content B of the minimum deviation register 20m (the initial value of B being the target weight value X). Since the inequality A<B naturally holds, the gates 20p, 20q are open so that the deviation value A is transferred to and stored in the minimum deviation register 20m, and the content (the combination pattern 0000000001) of n-bit counter 20a is stored in the best combination memory 20n. Thenceforth, when the second timing pulse TP is generated, the pulse is counted by counter 20a, whose content (combination pattern) is incremented to 0000000010. Consequently, the weight value output W2 of the weight sensor 12e-2 provided on the second weighing hopper is delivered to the arithmetic unit 20h which then performs the operation of equation (1) to produce the signal indicative of the deviation value A (=|W2−X|). The comparator 20r compares the deviation value A with the content B (=|W1−X|) of the minimum deviation register 20m. If the relation A≧B holds, then neither the register 20m nor the best combination memory 20n is updated; if A<B holds, the deviation value A is transferred to and stored in the minimum deviation register 20m, and the content of counter 20a is transferred to and stored in best combination memory 20n. The operation described above is repeated until all $2^n - 1$ combinations have been generated. At such time the content of the minimum deviation register 20m will be the minimum deviation value obtained from the $2^n - 1$ combinations, and the content of the best combination memory 20n will be the combination pattern that gave said minimum value. The best combination is thus selected from the total of $2^n - 1$ possible combination patterns.

When $2^n$ timing pulses TP have been generated, counter 20a produces the carry pulse Po, whereby the gating circuit 20s causes the ten-bit best combination pattern, stored in the best combination memory 20n, to be stored in the first through tenth bits of the first combination memory 20t. The 11th through 15th bits of the first combination memory are "0"s. The carry pulse Po generated by the counter 20a sets the flip-flop 20e (signal FS goes to logical "1"), and establishes the second combinatorial weighing mode. The first best combination pattern BCP enters the gating circuit 20d, and the multiplexer 20g receives, on lines $l_1$ through $l_5$, the weight values from those weight sensors corresponding to the "0" bits in the best combination pattern BCP, that is, from the weight sensors that have not been selected. Multiplexer 20g also receives the weight values W11 through W15 from the 11th through 15th weight sensors 12e-11 through 12e-15.

In the second combinatorial weighing mode, namely when signal FS is logical "1", the value of the count in counter 20a is applied to the multiplexer 20g. As a result, the arithmetic unit 20h executes combinatorial processing for all $2^n - 1$ possible combinations, just as in the first combinatorial processing, thereby finding the best combination pattern and storing this pattern in the best combination memory 20n. When $2^n$ timing pulses TP have been generated in the second combinatorial weighing mode, counter 20a produces the carry pulse Po. This causes the gating circuit 20s to provide the converter 20u with the best combination pattern stored in the best combination memory 20n. The converter 20u subjects the pattern to the conversion described above, with the result being stored in the second combination memory 20w. The OR gate 20x then takes the OR between the corresponding bits of the best combination patterns resulting from the first and second combinatorial computation operations, which patterns are stored in the 15-bit first and second combination memories 20t, 20w, respectively, and sends the resulting output signal to the drive control unit, which is not shown. The drive control unit opens the weighing hopper gates of the weighing hoppers corresponding to the "1" bits in the output of the OR gate 20x, whereby these weighing hoppers release their articles into the chute. This ends the divided combinatorial weighing operation for providing the target weight value $X_a$ which is larger than the permissible weight value.

Figure 5:
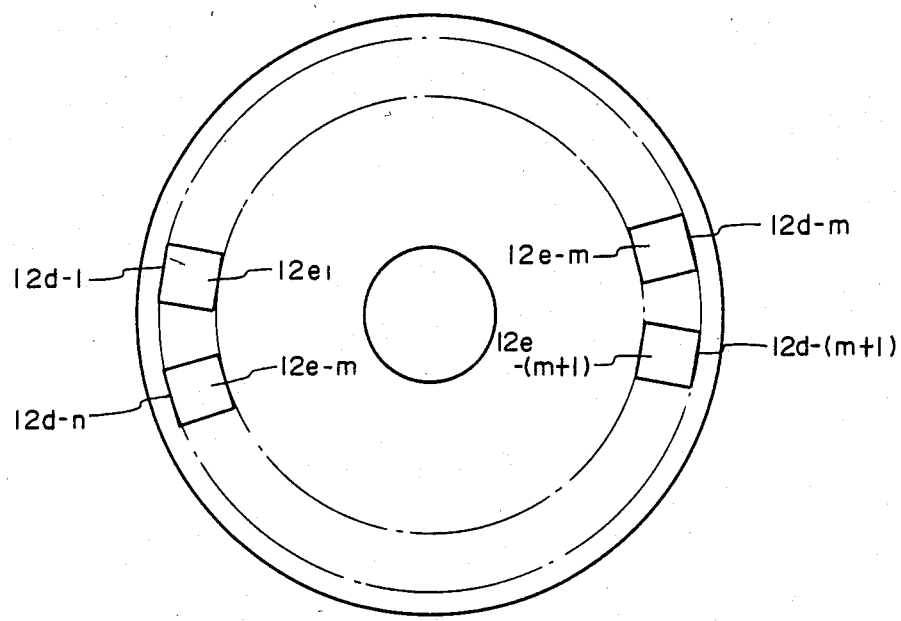
FIG. 5 is a schematic diagram useful in describing another embodiment of a combinatorial weighing method according to the present invention.

In the foregoing description, articles of only one kind are weighed out. It should be noted, however, that the method of the invention can also be applied to a situation where articles of two or more kinds are mixed and weighed out. By way of example, assume that two kinds of articles A1 and A2 are mixed at a predetermined weight ratio, and that it is required to weigh out the article mixture so that the total weight obtained is the target weight $X_a$. Assume also that the mixing ratio of articles A1 to A2 is 6:4. Under these conditions, and with reference to FIG. 5, weighing hoppers 12d-1 through 12d-m from among the total number of weighing hoppers 12d-1, 12d-2, ..., 12d-n (where m < n), are supplied with the articles A and the articles in these hoppers are weighed by the corresponding weight sensors 12e-1 through 12e-m. The remaining weighing hoppers 12d-(m+1) through 12d-n are supplied with the articles A2, and the articles in these hoppers are weighed by the corresponding weight sensors 12e-(m+1) through 12e-n. Combinations are computed for the articles A1 on the basis of the weight values provided by weight sensors 12e-1 through 12e-m with the target value being a weight value which is 60% of the target weight value $X_a$. In other words, the target value for articles A1 is $0.6X_a$. The best combination equal or closest to this target value is then selected. Thereafter, the total weight of the selected articles is compared with the target value, whereby an error E1 is found. Next, for the articles A2, the weight value (i.e., $0.4X_a$) which is 40% of the target weight value is combined with the error E1 to give a target value ($=0.4X_a+E1$) for use in a combinatorial computation based on the weight sensors 12e-(m+1) through 12e-n. The best combination equal to or closest to this target value is selected. Finally, the weighing hoppers selected as a result of the first and second combinatorial computations are allowed to discharge their articles into the chute 13 for collection in the timing hopper 14.

Although the weight ratio of the two kinds of articles A1 and A2 weighed out in this fashion will include some error, the total weight of the articles A1, A2 finally obtained will be that which is closest to the target weight $X_a$.

In accordance with the present invention as described and illustrated hereinabove, the error generated in each of a plurality of weighing operations is corrected for in the immediately succeeding weighing operation, so that the errors are not compounded. The only error that will remain will be that generated by the last weighing operation. As a result, the total weight of the articles provided by the weighing operations will be that which is closest to the target weight value, and great accuracy can be achieved when weighing out articles to obtain a weight greater than the permissible weight value, and when weighing out a mixture of two or more kinds of articles.

Another advantage of the invention is that the combinatorial computation steps are few in number, enabling rapid weighing, because the first combinatorial weighing process is executed using M-number of weighing machines (M<N, where N is the total number of weighing machines), followed by the second combinatorial weighing process executed using the unselected weighing machines and the remaining (N-M)-number of weighing machines. Moreover, weighing speed is increased even further owing to the fact that a weight greater than the permissible weight value can be obtained merely by a single supply, measurement and discharge operation for the articles.

Although a certain preferred embodiment has been shown and described in detail, it should be understood that many changes and modifications may be made therein without departing from the scope of the appended claims. That is to say, although it has been explained that all selected articles are discharged from the weighing machines into the chute at the same time, it is possible to discharge the selected articles seperately.

What we claim is:

1. A combinatorial weighing method in which the weights of groups of articles charged into a plurality of weighing machines having weighing hoppers, are measured to obtain measured weight values, combinations of the measured weight values are formed, the combination whose total weight value is equal to a target weight value or closest to the target weight value within preset allowable limits is selected, and the groups of articles specified by the selected combination are discharged from the corresponding weighing hoppers, said method comprising the steps of:

a. dividing the target weight value into a plurality of divided target values $X_i$ (i=1, 2, ...);
   b. executing processing for the formation of combinations on the basis of the measured weight values with respect to each of the divided target values $X_i$ (i=1, 2, ...), with groups of articles selected with respect to each of the divided target values not including groups of articles selected with respect to the other divided target values; and
   c. discharging the selected groups of articles from the corresponding weighing hoppers after completion of processing for the formation of combinations with respect to all of the divided target values, and charging groups of articles afresh into the weighing machines that have discharged their articles;
   said step b) including the step of computing an error $E_j$ (where j is an integer) between the total weight value of the combination of the groups of articles selected by the j-th processing step for the formation of combinations, and the divided target value $X_i$ serving as the divided target value for said processing step, and the step of adding the error $E_j$ to the divided target value $X_{i+1}$ and utilizing the resulting sum as the (j+1)-th divided target value.

2. A combinatorial weighing method according to claim 1, wherein, when the total number of weighing machines is N, where N is an integer, said step b) further comprises:

executing a first processing step for the formation of combinations, with X1 serving as the divided target value, using the measured weight values of the groups of articles charged into M1 (where M1 is an integer and M1<N) of the weighing machines;

executing a second processing step for the formation of combinations, with X2 serving as the divided target value, using the measured weight values of the groups of articles charged into M2 (where M2 is an integer and M2<N) of the weighing machines, from among those weighing machines not selected by said first processing step; and executing processing steps for the formation of combinations for the rest of the divided target values.

3. A combinatorial weighing method in which the weights of groups of articles charged into N weighing machines having weighing hoppers (where N is an integer), are measured to obtain measured weight values, combinations of the measured weight values are formed, the combination whose total weight value is equal to a target weight value $X_a$ or closest to the target weight value within preset allowable limits is selected, and the groups of articles specified by the selected combination are discharged from the corresponding weighing hoppers, said method comprising the steps of:

a. dividing the target value value $X_a$ into two divided target values X1, X2;

b. dividing the measured weight values of groups of articles charged into M (where M is an integer and M<N) weighing machines and selecting the combination thereof whose total weight value is equal to or closest to the divided target value X1 within preset allowable limits;

c. finding an error E between the total weight value of the combination of the groups of articles selected in said step (b), and the divided target value X1;

d. combining the measured weight values of the groups of articles charged into the weighing machines not selected in said step (b) and charged into the remaining P weighing machines (where P=N−m) and selecting a combination of the groups of articles whose total weight is equal to or closest to a corrected target value C (where C=X2−E) within preset allowable limits;

e. discharging the groups of articles from those weighing machines specified by the combinations slected in said steps (b) and (d); and f. charging groups of articles afresh into the weighing machines that have discharged their articles in said step (e).

4. A combinatorial weighing method according to claim 3, wherein said step (a) comprises dividing the target value into two equal divided target values $X1=X2=X_a/2$.

5. A combinatorial weighing method in which the weights of groups of articles charged into N weighing machines having weighing hoppers (where N is an integer), are measured to obtain measured weight values, combinations of the measured weight values are formed, the combination whose total weight value is equal to a target weight value $X_a$ or closest to the target value within preset allowable limits is selected, and the groups of articles specified by the selected combination are discharged from the corresponding weighing hoppers, said method comprising the steps of:

a. charging groups of articles of a first kind into N1 weighing machines and charging groups of articles of a second kind, different from the first kind, into N2 weighing machines, where N1 and N2 are integers and N1+N2=N;

b. setting target values X1, X2 for the groups of articles of the first and second kinds, respectively;

c. combining the measured weight values of the groups of articles of the first kind charged into N1 weighing machines and selecting the combination whose total weight is equal to or closest to the target value X1 within preset allowable limits;

d. finding an error E between the target value X1 and total weight value of the combination of the groups of articles of the first kind selected in said step (c);

e. combining the measured weight values of the groups of articles of the second kind charged into N2 weighing machines and selecting a combination of the groups of articles of the second kind whose total weight is equal to or closest to a corrected target value (X2−E) within preset allowable limits;

f. discharging the groups of articles of the first and second kinds from those weighing machines specified by the combinations selected in said steps (c) and (e); and g. charging groups of articles of the first and second kinds afresh into the weighing machines that have discharged their articles.

6. A combinatorial weighing method for obtaining a batch of articles having a total weight value equal to a target weight value or closest to the target weight value within preset allowable limits, said method comprising the steps of:

a. dividing the target weight value into target values Xi (where i is an integer and i=1, 2, ...);

b. supplying N measured weight values corresponding to the measured weights of N groups of articles, where N is an integer greater than or equal to 1;

c. executing processing for the formation of combinations on the basis of M selected measured weight values (where M is an integer) with respect to the first target value Xi to select a best combination whose total value is equal to the first target or closest to the first target value within preset allowable limits;

d. computing an error Ei between total weight value of the selected best combination and the target value Xi;

e. adding the error Ei computed in said step (d) to the target value Xi+1 to obtain a corrected target value;

f. executing processing for the formation of combinations on the basis of M selected measured weight values not including measured weight values selected with respect to other target values Xi, to select the best combination whose total value is equal to the corrected target value or closest to the corrected target value within preset allowable limits;

g. repeating said steps (d), (e) and (f) until processing has been executed for each of the target values Xi; and h. discharging the selected groups of articles corresponding to the selected best combinations of measured weight values selected with respect to all of the target values Xi to obtain the batch of articles.

* * * * *

UNITED STATES PATENT AND TRADEMARK OFFICE
CERTIFICATE OF CORRECTION

PATENT NO. : 4,508,185

DATED : APRIL 2, 1985

INVENTOR(S) : KAZUKIYO MINAMIDA ET AL.

It is certified that error appears in the above-identified patent and that said Letters Patent is hereby corrected as shown below:

FRONT PAGE, [73] Assignee:
line 2, "Seisakusuo" should be --Seisakusho--.

Col. 5, line 18, "desciption" should be --description--.

Col. 7, line 35, "n" should be --$\underline{n}$--;
line 37, "n" should be --$\underline{n}$--;
line 42, "n" should be --$\underline{n}$--;
line 52, "above mentioned" should be --above-mentioned--.

Col. 8, line 17, "$1_1, 1_2, 1_3, 1_4, 1_5$" should be --$\ell_1, \ell_2, \ell_3, \ell_4, \ell_5$--;

line 37, "$1_1$" should be --$\ell_1$--; and

"$1_{10}$" should be --$\ell_{10}$--.

UNITED STATES PATENT AND TRADEMARK OFFICE
CERTIFICATE OF CORRECTION

PATENT NO. : 4,508,185

DATED : APRIL 2, 1985

INVENTOR(S) : KAZUKIYO MINAMIDA ET AL.

It is certified that error appears in the above-identified patent and that said Letters Patent is hereby corrected as shown below:

Col. 9, line 37, "1000010100110" should be --100000010100110--.

Col. 10, line 51, "$1_1$" should be --$\ell_1$--; and

"$1_5$" should be --$\ell_5$--.

Col. 13, line 27, delete "value" (second occurrence);
line 29, "dividing" should be --combining--;
line 43, "P=N-m)" should be --P=N-M)--;
line 49, "slected" should be --selected--.

Col. 14, line 13, after "and" insert --the--.

Signed and Sealed this

Thirteenth Day of August 1985

[SEAL]

Attest:

DONALD J. QUIGG

Attesting Officer  Acting Commissioner of Patents and Trademarks